US006611129B2

United States Patent
Bucur

(10) Patent No.: US 6,611,129 B2
(45) Date of Patent: *Aug. 26, 2003

(54) VOLTAGE MODE, HIGH ACCURACY BATTERY CHARGER

(75) Inventor: Constantin Bucur, Sunnyvale, CA (US)

(73) Assignee: O2Micro International Limited, Cayman Islands (KN)

( * ) Notice: Subject to any disclaimer, the term of this patent is extended or adjusted under 35 U.S.C. 154(b) by 0 days.

This patent is subject to a terminal disclaimer.

(21) Appl. No.: 10/328,466

(22) Filed: Dec. 23, 2002

(65) Prior Publication Data

US 2003/0094925 A1 May 22, 2003

Related U.S. Application Data

(63) Continuation of application No. 09/948,828, filed on Sep. 7, 2001, now Pat. No. 6,498,461.
(60) Provisional application No. 60/313,260, filed on Aug. 17, 2001.

(51) Int. Cl.[7] .......................... H01M 10/44; H01M 10/46
(52) U.S. Cl. ........................................................ 320/145
(58) Field of Search ................................. 320/137, 139, 320/140, 141, 143, 145, 166

(56) References Cited

U.S. PATENT DOCUMENTS

| 4,621,313 | A | * | 11/1986 | Kiteley |
| 5,698,964 | A | * | 12/1997 | Kates et al. |
| 5,723,970 | A | * | 3/1998 | Bell |
| 5,912,549 | A | | 6/1999 | Farrington et al. ......... 323/207 |
| 5,920,475 | A | * | 7/1999 | Boylan et al. |
| 6,184,660 | B1 | * | 2/2001 | Hatular |
| 6,351,110 | B1 | * | 2/2002 | Papalardo et al. |
| 6,369,561 | B1 | * | 4/2002 | Papalardo et al. |
| 6,396,716 | B1 | | 5/2002 | Liu et al. ....................... 363/17 |
| 6,498,461 | B1 | * | 12/2002 | Bucur ......................... 320/145 |

* cited by examiner

*Primary Examiner*—Edward H. Tso
(74) *Attorney, Agent, or Firm*—Grossman Tucker Perreault & Pfleger

(57) ABSTRACT

A voltage mode battery charging system is provided that includes a battery current control section, a battery voltage control section, and a power control section. The battery current control section and battery voltage control section each generate signals indicative of the battery charging current and battery voltage, respectively. The power control section generates a signal indicative of the power available from an adapter source. Each of these signals is combined at common node, and if any of these sections exceeds a threshold, battery charging current is decreased.

18 Claims, 3 Drawing Sheets

VOLTAGE MODE, HIGH ACCURACY BATTERY CHARGER

This application is a continuation of, and claims priority to, application Ser. No. 09/948,828, filed Sep. 7, 2001 U.S. Pat. No. 6,498,461, which claims priority to U.S. Provisional Application Ser. No. 60/313,260, filed Aug. 17, 2001, both of which are hereby incorporated by reference.

The present application claims priority to Provisional Application Ser. No. 60/313,260, filed Aug. 17, 2001, and assigned to the same assignee.

FIELD OF THE INVENTION

The present invention relates to a battery charger circuit for charging one or more batteries. In particular, the present invention relates to a voltage mode battery charger that uses both current and voltage control to regulate the charging cycle and to provide accurate charging and charge termination.

SUMMARY OF THE INVENTION

In one aspect, the present invention provides a circuit for adjusting the duty cycle of a PWM signal. The circuit includes a battery current control section that generates a current control signal proportional to an amount battery charging current exceeds a predetermined battery charging current threshold. The circuit also includes a battery voltage control section that generates a voltage control signal proportional to an amount a battery voltage exceeds a predetermined battery voltage threshold. A compensation capacitor and a current source charging the compensation capacitor are also provided. A comparator generates a PWM signal based on the amplitude of the voltage on the compensation capacitor. The current source and the current control signal and voltage control signal are summed together at a common node, so that the current control signal and/or said voltage control signal reduce the voltage on the compensation capacitor thereby reducing the duty cycle of the PWM signal.

In another aspect, the present invention provides a battery charging circuit that includes a current control circuit generating a current control signal proportional to the amount battery charging current exceeds a predetermined battery charging current threshold; a voltage control circuit generating a voltage control signal to the amount battery voltage exceeds a predetermined battery voltage threshold; a DC/DC converter circuit generating the battery charging current from a DC source; and a PWM signal generator circuit generating a PWM signal for controlling the duty cycle of the DC/DC converter circuit. The PWM circuit comprises a comparator, an oscillator, a compensation capacitor and a current source charging the compensation capacitor. The comparator generates the PWM signal based on the voltage on the compensation capacitor. The current source and the current control signal and voltage control signal are summed together at a common node so that the current control signal and/or the voltage control signal reduce the voltage on the compensation capacitor thereby reducing the duty cycle of the PWM signal and thereby reducing the current delivered by the DC/DC converter circuit.

It will be appreciated by those skilled in the art that although the following Detailed Description will proceed with reference being made to preferred embodiments and methods of use, the present invention is not intended to be limited to these preferred embodiments and methods of use. Rather, the present invention is of broad scope and is intended to be limited as only set forth in the accompanying claims.

Other features and advantages of the present invention will become apparent as the following Detailed Description proceeds, and upon reference to the Drawings, wherein like numerals depict like parts, and wherein:

DETAILED DESCRIPTION OF EXEMPLARY EMBODIMENTS

Figure 1:
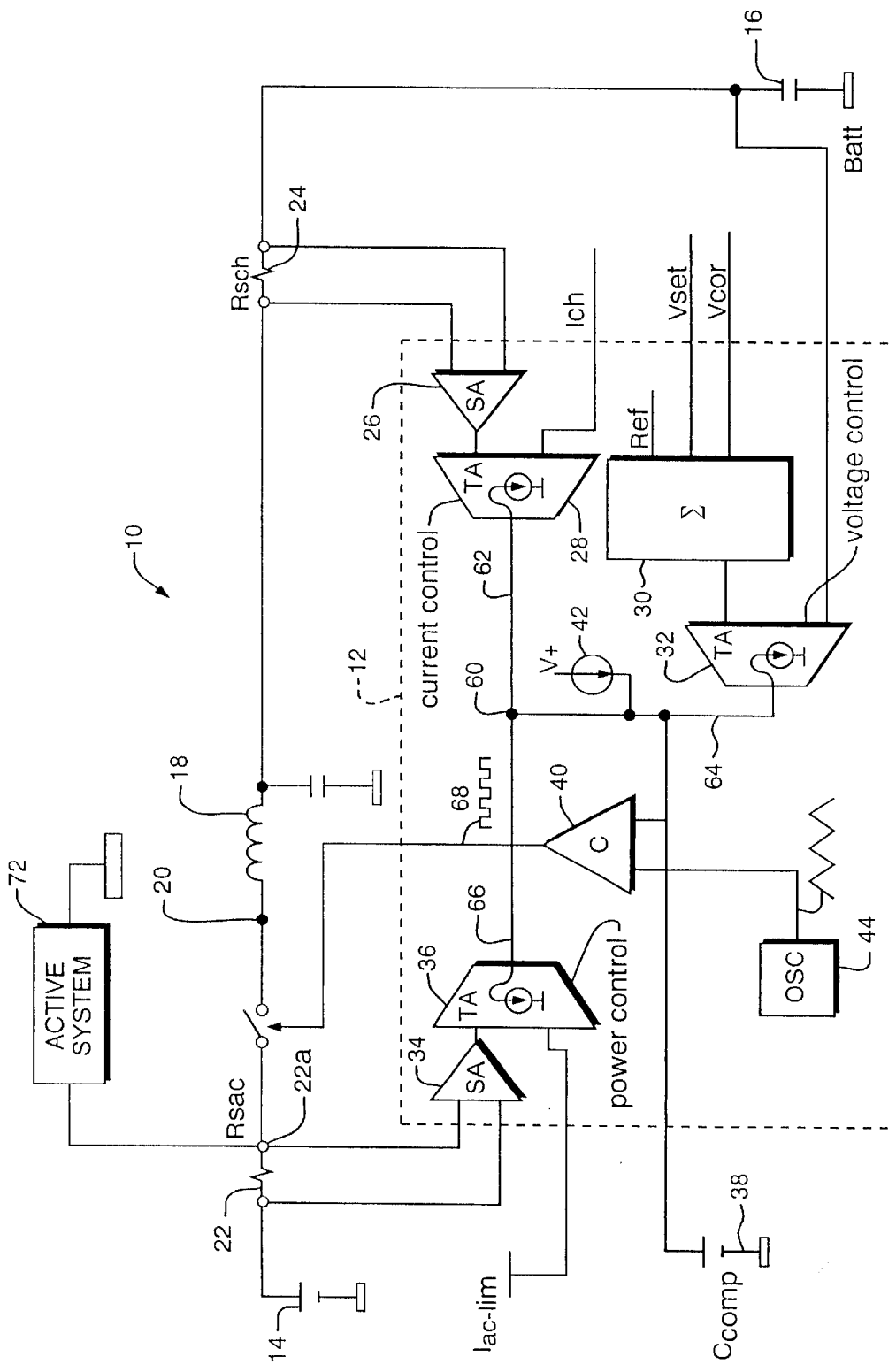
FIG. 1 is a block diagram of an exemplary battery cell charging system according to the present invention.

FIG. 1 depicts a voltage mode battery charger system 10 according to one exemplary embodiment. The system 10 includes a voltage mode battery charger circuit 12 for charging one or more batteries 16 using a DC source 14. The DC source may be an AC/DC adapter or other power supply. Circuit 12 operates to control the duty cycle of the Buck converter circuit 18 (comprising an inductor and capacitor, as is well understood in the art) via switches 20, to control the amount of charging power delivered to the battery 16. As an overview, circuit 12 controls the duty cycle of the Buck converter 18 by monitoring the source current, the battery charging current (current mode) and the battery voltage (voltage mode). Battery charging current is sensed across the sense resistor (or impedance) Rsch. Instead of sensing the current through the inductor (as in conventional current mode topologies), the present invention uses a voltage mode topology by sensing the current across Rsch. In this manner, and by utilizing both battery current control and voltage, the present invention achieves more accurate charging of the battery towards the end of the charging cycle, and provides more accurate charge termination than can be achieved with conventional current mode charging topologies. The details of the system 10 are described below.

Essentially, the charger circuit 12 operates to control the duty cycle of the buck converter 18 by controlling the power on the compensation capacitor Ccomp 38. The circuit 12 includes a battery current control section comprised of sense amplifier 26 and transconductance amplifier 28, a battery voltage control section comprised of summing block 30 and transconductance amplifier 32, and a power control section comprised of sense amplifier 34 and transconductance amplifier 36. The battery current control section and battery voltage control section each generate signals indicative of the battery current and voltage, respectively. The power control section generates a signal indicative of the power available from the source 14. Each of these sections is combined (at node 60), and if any of these sections exceeds a threshold, the power delivered to the charge capacitor decreases, thereby reducing the duty cycle of the Buck converter. This operation is described in greater detail below.

The duty cycle of the Buck converter 18 is controlled by the comparator 40, via switches 20. The input of the comparator 40 is the voltage on the compensation capacitor (Ccomp) 38 and a sawtooth signal generated by the oscillator 44. The output of the comparator 40 is a PWM signal 68, whose pulse width (duty cycle) is reflected in the intersection of the amplitude of the voltage on Ccomp 38 and the sawtooth signal. In this sense, the duty cycle of the PWM signal thus generated is based on the voltage on the compensation capacitor 38 and the sawtooth signal generated by the oscillator 44. "Based on", as used herein, is to be interpreted broadly and generally means "as function of" or "related to". The higher the amplitude of the voltage on Ccomp, the greater the duty cycle of the PWM signal 68. In the exemplary embodiment, the sawtooth signal is a fixed frequency signal, and the duty cycle of the PWM is therefore adjusted by adjusting the amplitude of the voltage on Ccomp 38. Ccomp 38 is charged by the current source 42. When no signal is generated by any of the current control section, the voltage control section or the power control section, the current source charges Ccomp to maximum level, and thus the PWM is at maximum duty cycle and the Buck converter is delivering maximum charging current and voltage to the battery. Any signal generated by the current control section, the voltage control section or the power control section acts as a sink to the compensation capacitor 38, thereby reducing the voltage on the compensation capacitor and thereby reducing the duty cycle of the PWM signal. In this manner, charging current is controllably delivered to the battery 16. The particulars of the Buck converter 18 and switches 20 are well understood in this art, and are not important to the present invention, and may be generalized as a controllable DC/DC converter circuit.

Current Control

The current control section (circuit) includes a sense amplifier 26 and a transconductance amplifier 28. The sense amplifier monitors the battery charging current across the sense impedance Rsch 24, and generates a signal proportional to battery charge current. The transconductance amplifier 28 receives the output of the sense amplifier 26 and compares that signal with a programmed (desired) battery current signal Ich. As a general matter, the inputs of the transconductance amplifier 28 are voltage signals, and the output is a proportional current signal. The output of the transconductance amplifier is the current control signal 62, which is proportional to the amount the battery charging current exceeds the programmed Ich. Ich is zero until the battery charging current exceeds the programmed current value Ich. The programmed value Ich is set to according to the particular battery type and requirements, for example set to charge a conventional LiIon battery, as is well understood in the art.

If the battery charging current exceeds the threshold Ich, the amplifier 28 generates a proportional current control signal 62. Since the output of the amplifier is coupled to the negative side of the current source 42 (at node 60), any signal generated by the amplifier 28 acts to sink current from the source 42. In turn, this operates to reduce the voltage on Ccomp 38, thereby reducing the duty cycle of the PWM signal 68 and reducing the charging current delivered to the battery. Since the output current control signal 62 is proportional to the input values, the duty cycle is dynamically adjusted as a function of battery charging current.

Figure 2:
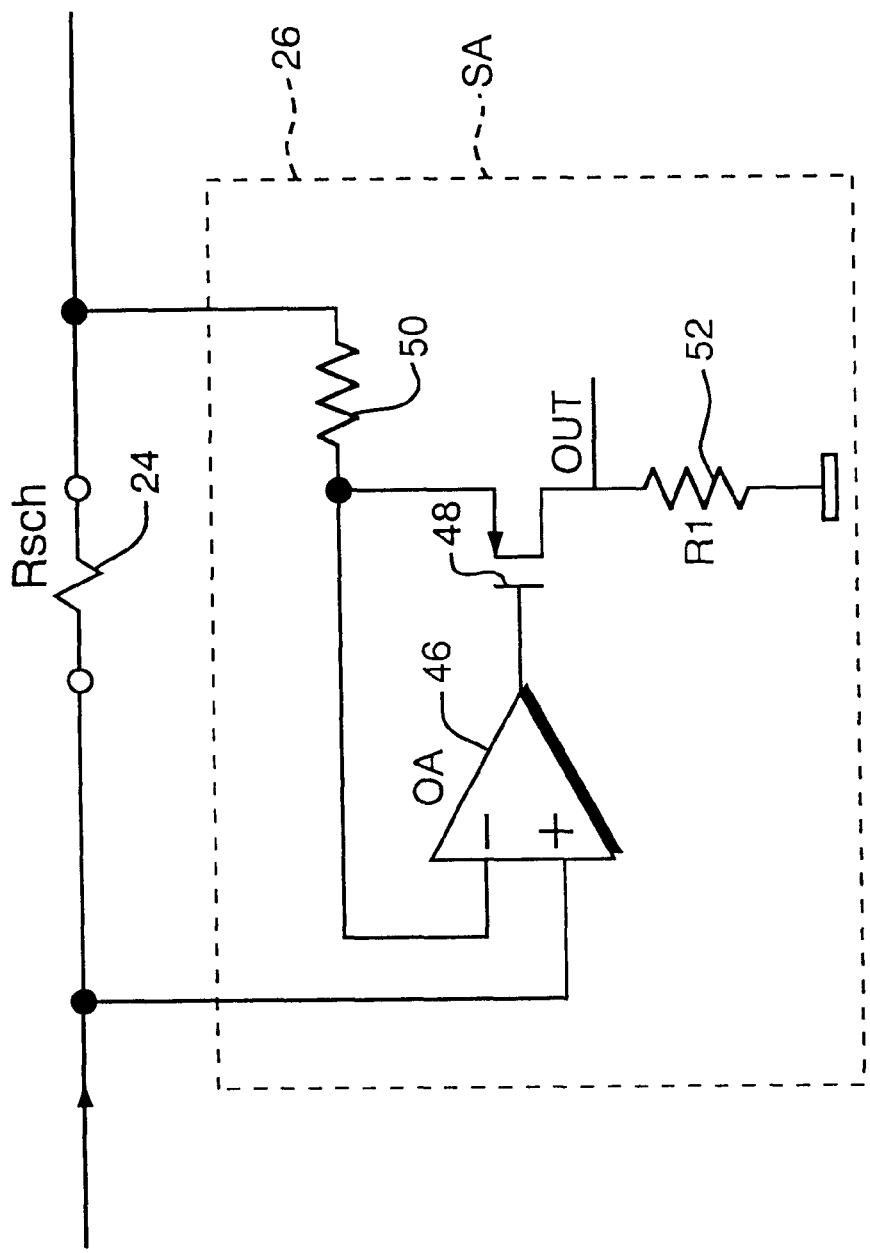
FIG. 2 is an exemplary amplifier circuit of the present invention.

The current sense amplifier 26 may be a custom or off-the-shelf amplifier, as is readily available in the art. However, as is also understood in the art, amplifier 26 must provide large common mode voltage rejection. Accordingly, and referring now to FIG. 2, another aspect of the present invention is an amplifier configuration to alleviate the requirement for large common mode voltage rejection. The sense amplifier 26 depicted in FIG. 2 includes a switch 48 controlled by an operational amplifier 46, and gain resistors R1 50 and R2 52. The amplifier 26 of FIG. 2 is not sensitive to common mode voltage. Rather, the switch transfers the floating differential voltage that appears across Rsch by referring it to ground and amplifying the voltage according to the gain given by R2/R1.

Voltage Control

The voltage control section (circuit) includes the summing block 30 and a transconductance amplifier 32. In the exemplary embodiment, the summing block 30 includes three inputs: a high-precision reference or trim voltage Ref, a voltage set (Vset) and a voltage correction (Vcor) signal. In the exemplary embodiment, the battery 16 is a LiIon battery. LiIon batteries are very sensitive to overvoltage conditions, and indeed become hazardous if overcharged. Thus, the reference or trim signal Ref is accurate to within the tolerance required by the battery. For LiIon, the tolerance is on the order of +/−0.005 Volts. However, other battery types and reference voltage requirements are equally contemplated herein. Vset represents a voltage setting value, usually supplied by the manufacturer of the battery. Vcor is a correction signal that is proportional to the charging current, and is provided as a compensation signal for the particulars of the charging apparatus and for parasitic resistance associated with the battery (since battery voltage cannot be measured directly, and one must factor in parasitic resistance). Although not shown, Vcor can be obtained by tapping a voltage divider placed in parallel with the output of sense amplifier 26. These three signals are summed in a weighted fashion in summing block 30. For example, the output of the summing block 30 can be set to the reference voltage +(Vset/x)+Vcor/y); where x and y are chosen in accordance with the desired voltage setting value and correction value, respectively. Vcor and Vset need not be as accurate as the reference voltage, since their contribution is divided diminished by x and y.

The output weighted voltage signal from the summer block 30 may be generally deemed as a predetermined battery voltage threshold signal. The transconductance amplifier 32 compares the output of the summer block to the battery voltage. The output of the amplifier 32 is a voltage control signal 64, which is proportional to the amount the battery voltage exceeds the threshold established by the summing block. As with the current control section described above, signal 64 is nonzero if the battery voltage exceeds the threshold determined by the summer block. Since the output of the amplifier 32 is coupled to the negative side of the current source 42 (at node 60), any signal 64 generated by the amplifier 32 acts to sink current from the source. In turn, this operates to reduce the voltage on Ccomp 38, thereby reducing the duty cycle of the PWM signal 68 and reducing the charging current delivered to the battery. Since the output 64 of the amplifier 32 is proportional to the input values, the duty cycle is dynamically adjusted to achieve a desired battery voltage.

Power Control

The power control section (circuit) includes a sense amplifier 34 and a transconductance amplifier 36. The power control section is provided to reduce the duty cycle of the Buck converter, and thereby reduce the charging current delivered to the battery if the DC source needs to deliver more power to an active system 72 (e.g., portable electronic device) attached to the source. The active system is coupled in parallel to the charging system 10 across the sense resistor Rsac. Since the total amount of power provided by the source 14 is fixed, in a well-designed system the load requirements of the active system and battery charging circuit are balanced. The power control section ensures that the active system always takes priority (in terms of power requirements) by reducing the charging current to meet the demands of the active system. Accordingly, the power control section generates a power control signal 66 proportional to the amount of power required by the battery charger and the active system exceeds the threshold Iac_lim. Iac_lim is typically the maximum that can be delivered by the adapter source 14. For example, the source 14 may be simultaneously supplying power to an active system (not shown) and charging current to the battery. If the portable system requires more power, charging current to the battery is accordingly reduced to meet the demands of the system. The source 14 is generally defined as a DC power source, as may be supplied from an AC/DC adapter.

The sense amplifier 34 monitors the total adapter current delivered by the source 14 across the sense impedance Rsac 22. The total adapter (source) current includes the system current (i.e., current delivered to a portable system (not shown) connected to the source 14) and the battery charger circuit 12 (which is a measure of the charging current divided by duty cycle of the Buck converter 18). The signal across the sense resistor Rsac is a signal proportional to the total adapter current. The transconductance amplifier 36 receives the output of the sense amplifier 34 and compares that signal with a power threshold signal Iac_lim. Thus, if the signal across the sense resistor is larger than Iac_lim, this indicates that the system is requiring more power, and accordingly battery charging current is to be reduced. Of course, this limit signal may be fixed, or may be adjusted based on the dynamic power requirements of the system and/or changes in the source. The output of the transconductance amplifier is the power control signal 66, which is zero until the power required by the battery charger and the active system exceeds the threshold value $Iac_{lim}$.

If the power required by the battery charger and the active system exceeds the threshold Iac_lim, the amplifier 36 generates a proportional power control signal 66. Since the output of the amplifier is coupled to the negative side of the current source 42 (at node 60), any signal generated by the amplifier 36 acts to sink current from the source. In turn, this operates to reduce the voltage on Ccomp 38, thereby reducing the duty cycle of the PWM signal 68 and reducing the charging current delivered to the battery. Since the output 66 of the amplifier 36 is proportional to the input values, the duty cycle is dynamically adjusted as a function of balancing power demands between a system and the battery, and so as not to exceed a maximum power output of the DC source 14.

Figure 3:
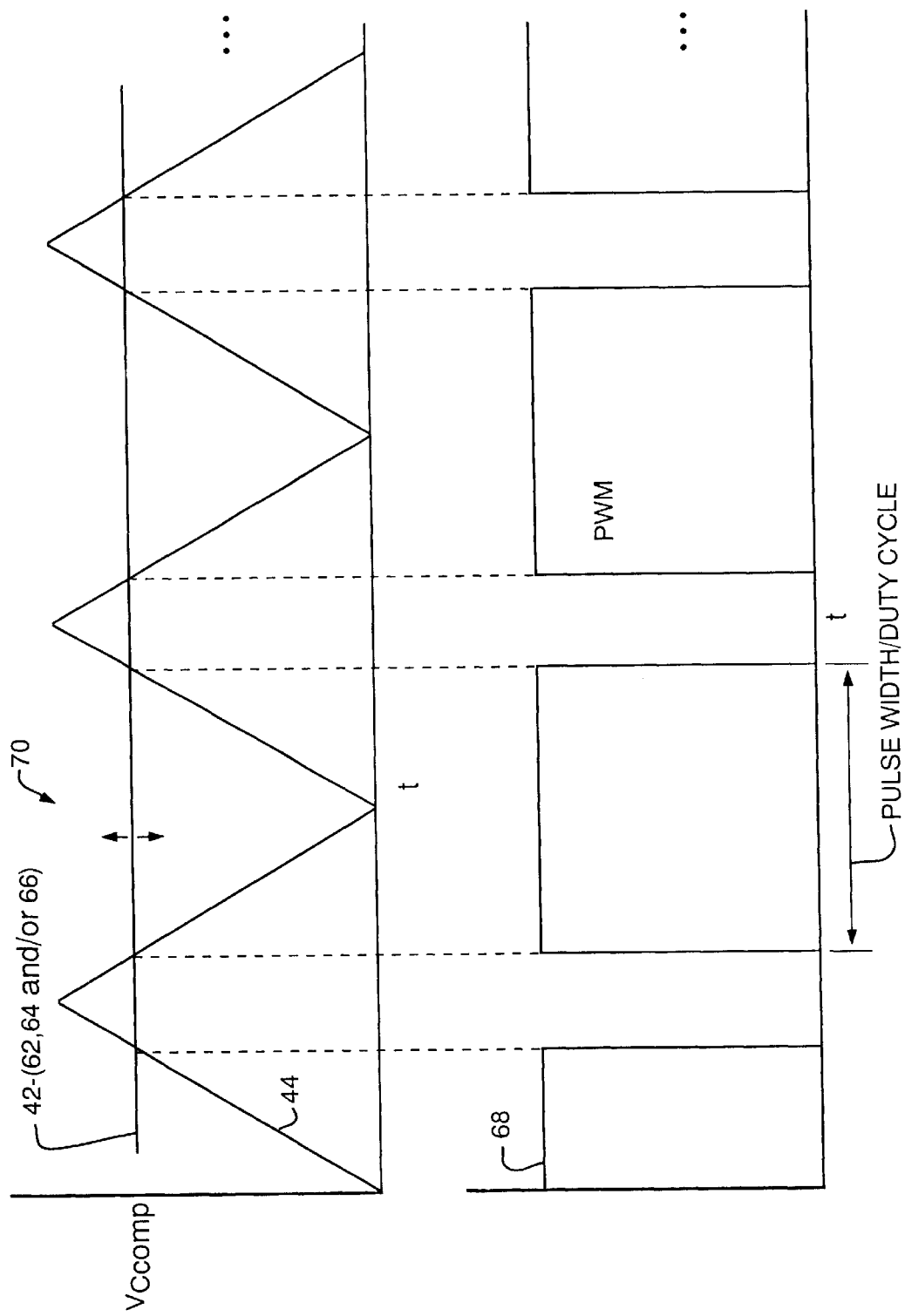
FIG. 3 is a timing diagram representing an oscillator signal and DC signal to generate a PWM signal of the system of FIG. 1.

FIG. 3 depicts a timing diagram 70 representing the PWM signal 68 (bottom figure) and the intersection between the voltage on the compensation capacitor, Vccomp, and the sawtooth signal 44 (top figure). In the present exemplary embodiment, Vccomp is essentially a DC signal whose amplitude is moved up by the current source 42, and down by either the current control signal 62, the voltage control signal 64 or the power control signal 66. In other words, the value (amplitude) of Vccomp is the sum of signals (42-(62, 64 and/or 66)). By moving the value of Vccomp downward, the duty cycle of PWM signal is decreased.

Thus, with present invention, the duty cycle of the PWM signal can be adjusted using a differential the compensation capacitor. In the exemplary embodiments, adjusting the PWM is accomplished dynamically as a function of battery charging current, battery voltage and/or system power requirements. The topology depicted in FIG. 1 is a voltage mode topology. Voltage mode topology means that the sense resistor Rsch is placed outside of the Buck converter, and thus the current across this resistor is a DC value (without ripple). Those skilled in the art will recognize numerous modifications to the present invention. These and all other modifications as may be apparent to one skilled in the art are deemed within the spirit and scope of the present invention, only as limited by the appended claims.

What is claimed is:

1. A circuit for controlling the duty cycle of a PWM signal, comprising:
    a battery current control section generating a current control signal proportional to an amount a battery charging current exceeds a predetermined battery charging current threshold;
    a battery voltage control section generating a voltage control signal proportional to an amount a battery voltage exceeds a predetermined battery voltage threshold; and
    a comparator generating a PWM signal based on the amplitude of said current control signal and/or said voltage control signals.

2. A circuit as claimed in claim 1, further comprising a compensation capacitor and a current source charging said compensation capacitor; said current source and said current control signal and voltage control signal summed together at a common node, wherein the duty cycle of said PWM signal based on the of the voltage on said compensation capacitor, and current control signal and/or said voltage control signal reducing the voltage on said compensation capacitor thereby reducing the duty cycle of said PWM signal.

3. A circuit as claimed in claim 2, further comprising a power control section generating a power control signal proportional to an amount of total current that is required by an active system and a battery charger; said current source and said current control signal and voltage control signal and said power control signal summed together at said common node, said current control signal and/or said voltage control signal and/or said power control signal reducing the voltage on said compensation capacitor thereby reducing the duty cycle of said PWM signal.

4. A circuit as claimed in claim 3, herein said power control section comprises a sense amplifier for sensing the total current generated by said source and generating a signal indicative of said total current generated by DC source, and a transconductance amplifier comparing said signal indicative of said total current generated by said source with a predetermined power threshold signal.

5. A circuit as claimed in claim 4, wherein said power control signal has a nonzero value if said signal indicative of said total current generated by said source exceeds said power threshold signal.

6. A circuit as claimed in claim 1, wherein said current control section comprises a sense amplifier for sensing charging current supplied to said battery and generating a signal indicative of charging current supplied to said battery, and a transconductance amplifier comparing said signal indicative of charging current supplied with a predetermined charging current signal and generating said current control signal.

7. A circuit as claimed in claim 6, wherein said current control signal has a nonzero value if said signal indicative of charging current supplied to said battery exceeds said predetermined charging current signal.

8. A circuit as claimed in claim 1, wherein said voltage control section comprises a summing block generating a predetermined battery voltage signal, and a transconductance amplifier comparing said signal indicative of battery voltage with said predetermined signal and generating said voltage control signal.

9. A circuit as claimed in claim 8, wherein said summing block having a first input signal comprising a reference voltage signal, said reference signal being selected in accordance with a threshold voltage for said battery, a second input signal comprising a battery voltage setting signal, said battery voltage setting signal being generated by said battery, and a third input signal comprising a voltage correction signal, said voltage correction signal compensating for parasitic capacitance of said battery, wherein said summing block providing a weighted sum of said first, second and third input signals to generate said battery voltage threshold signal.

10. A circuit as claimed in claim 2, further comprising an oscillator generating a fixed frequency sawtooth signal, said comparator comparing said sawtooth signal and said amplitude of the charge on said charge capacitor and generating said PWM signal having a duty cycle adjusted by said amplitude of the charge on said charge capacitor.

11. A circuit as claimed in claim 1, further comprising a Buck DC/DC converter circuit coupled to a plurality of switches and a DC power source, said PWM signal controlling the conduction states of said switches to control the duty cycle of said Buck converter to adjust the amount of charging current delivered to said battery from said DC power source.

12. A circuit as claimed in claim 4, wherein said sense amplifier comprising an operational amplifier coupled in parallel to a sense resistor, said operational amplifier sensing the current through a sense resistor, said current through said sense resistor indicative of said current supplied to said battery; a switch coupled between one input of said operational amplifier and ground, the conduction state of said switch being controlled by the output of said operational amplifier; and first and second gain resistors placed between said sense resistor and said one input of said operational amplifier, and between said switch and a reference node, respectively; wherein said signal indicative said charging current supplied to said battery being taken from a node between said second resistor and said switch.

13. A circuit as claimed in claim 3, wherein said active system comprising a portable computer.

14. A circuit as claimed in claim 4, wherein said DC source comprises an AC/DC adapter.

15. A method for controlling the duty cycle of a PWM signal, comprising:

generating a current control signal proportional to an amount a battery charging current exceeds a predetermined battery charging current threshold;

generating a voltage control signal proportional to an amount a battery voltage exceeds a predetermined battery voltage threshold; and generating a PWM signal based on the amplitude of said current control signal and/or said voltage control signals.

16. A method as claimed in claim 15, further comprising the step of:

sensing said battery charging current across a sense resister coupled to said battery.

17. A method as claimed in claim 15, further comprising the steps of: charging said compensation capacitor;

summing said current source and said current control signal and voltage control signals together at a common node; and reducing the voltage on said compensation capacitor based on said current control signal and/or said voltage control signal thereby reducing the duty cycle of said PWM signal.

18. A method as claimed in claim 17, further comprising the steps of:

generating a power control signal proportional to an amount of total current that is required by an active system and a battery charger;

summing said current source and said current control signal and voltage control signal and said power control signal together at said common node; and reducing the voltage on said compensation capacitor based on said current control signal and/or said voltage control signal and/or said power control signal thereby reducing the duty cycle of said PWM signal.

* * * * *

UNITED STATES PATENT AND TRADEMARK OFFICE
CERTIFICATE OF CORRECTION

PATENT NO.   : 6,611,129 B2
DATED        : August 26, 2003
INVENTOR(S)  : Bucur

It is certified that error appears in the above-identified patent and that said Letters Patent is hereby corrected as shown below:

<u>Column 6,</u>
Line 34, after "3," delete "herein" and insert -- wherein --

Signed and Sealed this

Eleventh Day of November, 2003

JAMES E. ROGAN
*Director of the United States Patent and Trademark Office*